(12) United States Patent
Rogers et al.

(10) Patent No.: US 7,032,077 B2
(45) Date of Patent: Apr. 18, 2006

(54) MULTIPLE CACHE COHERENCY

(75) Inventors: Paul L. Rogers, Fort Collins, CO (US); Robert F. Krick, Fort Collins, CO (US); Vipul Gandhi, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 287 days.

(21) Appl. No.: 10/327,778

(22) Filed: Dec. 23, 2002

(65) Prior Publication Data

US 2004/0123034 A1 Jun. 24, 2004

(51) Int. Cl.
*G06F 12/12* (2006.01)
(52) U.S. Cl. .................... 711/138; 711/130; 711/141
(58) Field of Classification Search ........ 711/118–122, 711/130, 146
See application file for complete search history.

(56) References Cited

U.S. PATENT DOCUMENTS

| | | | | |
|---|---|---|---|---|
| 5,490,261 A | * | 2/1996 | Bean et al. ................. | 711/121 |
| 5,642,494 A | * | 6/1997 | Wang et al. ................. | 711/140 |
| 5,895,487 A | * | 4/1999 | Boyd et al. ................. | 711/122 |
| 6,047,357 A | * | 4/2000 | Bannon et al. ............. | 711/133 |
| 6,088,769 A | * | 7/2000 | Luick et al. ................. | 711/141 |
| 6,385,694 B1 | * | 5/2002 | Arimilli et al. ............. | 711/118 |
| 6,430,654 B1 | * | 8/2002 | Mehrotra et al. ........... | 711/118 |
| 6,484,238 B1 | * | 11/2002 | Cutter ........................ | 711/133 |
| 6,751,706 B1 | * | 6/2004 | Chauvel et al. ............. | 711/122 |

OTHER PUBLICATIONS

Brian Forney, Steven Hart, and Matt McCormick, "An Analysis of Cache Sharing in Chip Multiprocessors", Sep. 15, 2001, http://www.cs.wisc.edu/~mattmcc/papers/MPCacheStudy.pdf, p. 1.*

Jim handy. The Cache Memory Book. 2nd edition. 1998 Academic Press, pp. 156-158.*

* cited by examiner

*Primary Examiner*—Donald Sparks
*Assistant Examiner*—Jesse Diller

(57) ABSTRACT

A memory architecture with a multiple cache coherency includes at least one processor with a storage area in communication with a cache memory. A main bus transmits and receives data to and from the cache memory and the processor. A coherency control in communication with the cache memory and the processor is configured to determine an existence or location of data in the cache memory or the storage area in response to a data request from the main bus. The coherency control dispatches an existence or location result to the main bus.

17 Claims, 2 Drawing Sheets

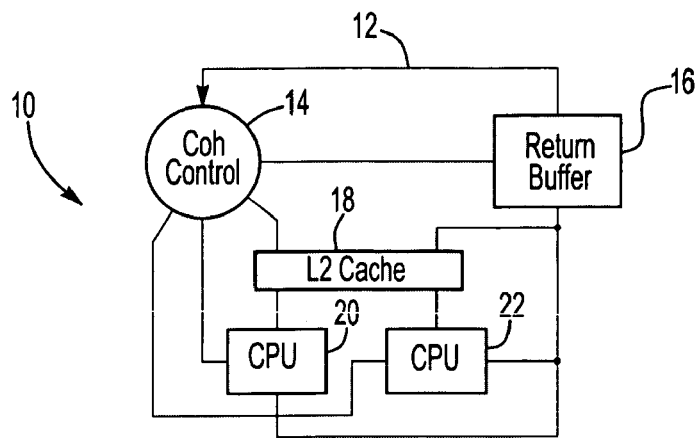
*Fig-1*
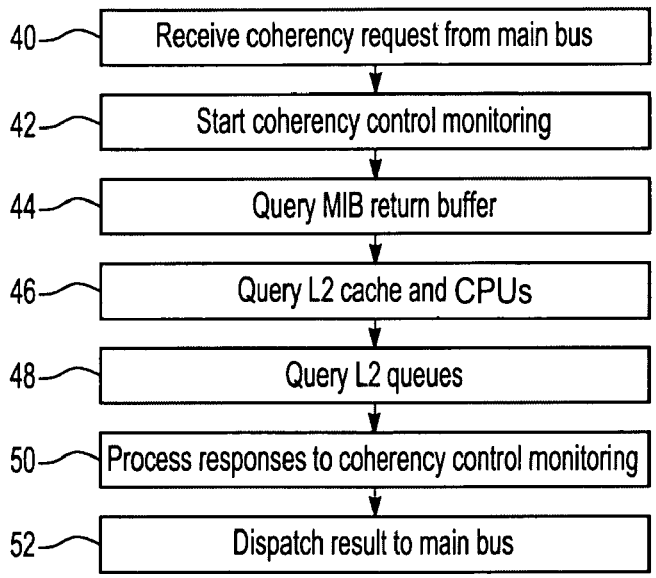
*Fig-3*
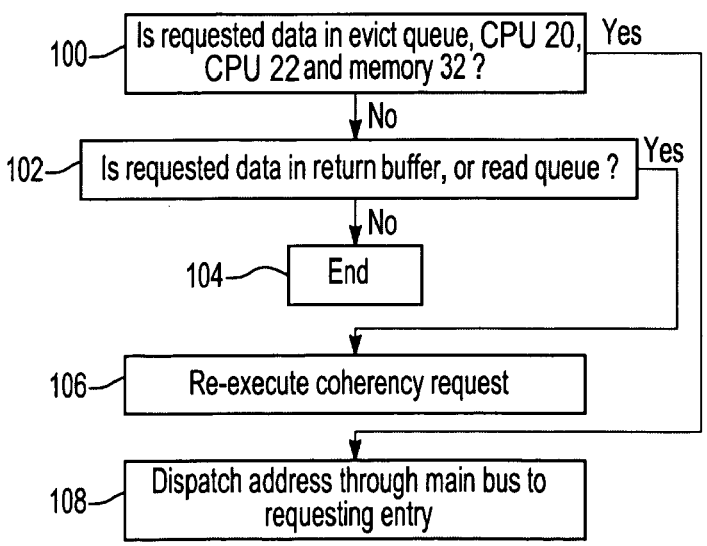
*Fig-4*
*Fig-5*

MULTIPLE CACHE COHERENCY

RELATED APPLICATIONS

The present application is related to the previously filed, commonly assigned U.S. patent application Ser. No. 10/118,801 entitled "SYSTEM OF AND METHOD FOR FLOW CONTROL WITHIN A TAG PIPELINE," filed on Apr. 9, 2002, and commonly assigned U.S. patent application Ser. No. 09/853,951, entitled "SYSTEM OF AND METHOD FOR MEMORY ARBITRATION USING MULTIPLE QUEUES," filed on May 10, 2001, the disclosures of which are hereby incorporated herein by reference.

BACKGROUND

Conventional computer architectures commonly include a cache memory structure to facilitate read and write data from a main memory for enhancing memory access time. The cache memory maintains copies of read and write data from the main memory. These copies may be based on most recent transactions or may be based on more complicated algorithms.

While such memory architecture increases the speed at which external devices retrieve data from the main memory, drawbacks exist with respect to the application of a single cache to multiple CPUs.

SUMMARY

In representative embodiments a memory architecture is provided that includes a main bus, at least one CPU, a cache memory that caches the CPU, and a coherency control that determines the existence or location of a data request received from the main bus.

BRIEF DESCRIPTION OF THE DRAWINGS

The representative embodiments will now be described, by way of example, with reference to the accompanying drawings, in which:

FIG. 1 is a schematic view of an embodiment of a memory architecture using a coherency control according to representative embodiments;

FIG. 3 is a flow chart depicting the operation of an embodiment of a coherency control according to representative embodiments;

FIG. 4 is a flow chart depicting the operation of an embodiment of a coherency control according to representative embodiments; and FIG. 5 is a block diagram depicting the operation of an embodiment of a coherency control according to representative embodiments.

DETAILED DESCRIPTION

Figure 2:
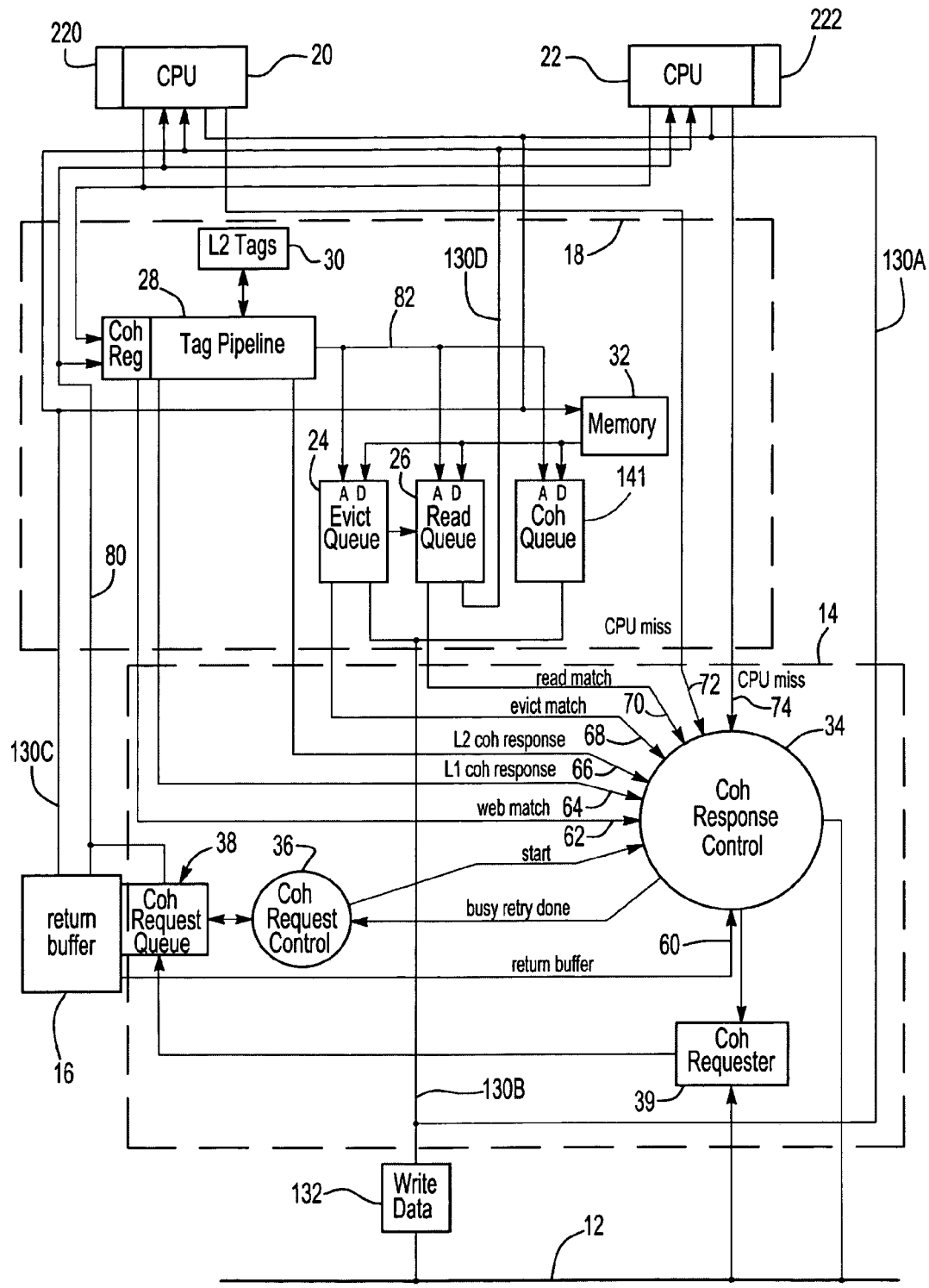
FIG. 2 is a schematic view illustration of an embodiment of a memory architecture using a coherency control according to representative embodiments.

Representative embodiments may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes that come within the meaning and range of equivalency of the claims are to be embraced within their scope.

Referring now to FIG. 1, an embodiment of memory architecture 10 is shown with a coherency control according to representative embodiments. In the embodiment shown in FIG. 1, the memory architecture 10 generally includes coherency control 14, return buffer 16, L2 cache 18, CPU 20 and CPU 22. Additionally, main bus 12 is provided that allows address and data transfer between memory architecture 10 and external components (not illustrated) such as other memory or processing architectures. Coherency control 14 preferably communicates with the main bus and elements of the memory architecture 10, such as return buffer 16, L2 cache 18 and CPUs 20 and 22 to facilitate coherency control by ensuring that shared, private or private dirty data residing in any of the elements of the memory architecture 10 is provided to a requesting entity, external to memory architecture 10, via main bus 12. It should be understood that if data is held in a private dirty state, then the data is modified from that stored in main memory and is held exclusively at one location.

Referring now to FIG. 2, an embodiment of memory architecture 10 is described in greater detail. In FIG. 2, CPUs 20 and 22 represent individual processors and memory storage areas. Although only two CPUs are shown, it will be understood that any number of CPUs may be used with representative embodiments including one or more, and the representative embodiments are not limited to the number of CPUs disclosed and illustrated herein. Each CPU preferably includes its own dedicated first level L1 cache 220 and 222 for caching read and write data from each respective CPU 20 and 22. Caches 220 and 222 can be of any caching architecture including, but not limited to, direct-mapped, set-associative and fully-associative architectures.

L2 cache 18 is a second level cache that copies read and write data from CPUs 20 and 22 as well as caches 220 and 222. L2 cache 18 generally includes evict queue 24, read queue 26, coherency queue 141, tag pipeline 28, L2 tags 30, and memory 32. It should be understood, however, that other cache architectures may be employed by representative embodiments. Memory 32 is the memory where the L2 cache stores read and write data from CPUs 20 and 22. Memory 32 is preferably a fast memory structure such as a DRAM or SRAM to allow fast processing and high bandwidth data transfer to maximize data retrieval from L2 cache 18. Evict queue 24 acts as a buffer for evicting dirty or modified lines from memory 32 back to CPUs 20 or 22 or other main memory. The evict queue 24 preferably works with tag pipeline 28 to flush data from the L2 memory 32. Coherency queue 141 works in conjunction with coherency control 14 to dispatch requested data to a requesting entity as will be described in greater detail.

Read queue 26 is a temporary storage area or buffer that temporarily stores data from the L2 cache 18 being read by CPUs 20 or 22. Read queue 26 temporarily stores at least one line from memory 32 before being dispatched to its destination. This assists in freeing main bus 12 and other busses for data delivery and transfer.

Tag pipeline 28 works in conjunction with L2 tags 30 to determine whether requested cache lines are resident within memory 32. L2 tags 30 contain tags of all data stored in memory 32. If the requested cache line and tag line of a cache entry match, then the request is forwarded to the read queue 26 for dispatching the associated data to the requesting entity.

Main bus 12 provides address and data communication between memory architecture 10 and devices external thereto. External devices may include any known or novel processing or storage entity. Return buffer 16 buffers data returning from main bus 12 back to CPU 20, CPU 22 or L2 cache 18 and may be a McKinley Interface block (MIB) or other buffer.

With continued reference to FIG. 2, coherency control 14 is described in greater detail. Coherency control 14 can be on-chip with the L2 cache 18 or can be separate from the L2 cache 18. Coherency control 14 communicates with return buffer 16, L2 cache 18, CPU 20 and CPU 22 to determine the existence and location of requested data within the memory architecture 10. If found, coherency control 14 facilitates dispatch of the requested data to the requesting entity, or removal of the data as will be discussed hereinafter.

In FIG. 2, coherency control 14 includes coherency response control 34, coherency request control 36, coherency request queue 38, and coherency requester 39. Coherency requester 39 monitors main bus 12 for data requests transmitted therealong. Upon receiving a data request from a requesting entity along main bus 12, Coherency requester transmits address information of the data to Coherency request queue 38.

Coherency request queue 38 is a buffer that maintains data requests from Coherency requester 39 and dispatches the address information to entities within memory architecture 10. Coherency request queue 38 dispatches the address information responsive to coherency request control 36.

Coherency request control 36 communicates with coherency request queue 38 to instruct coherency request queue 38 to dispatch requests to memory architecture 10. Additionally, coherency request control 36 communicates with coherency response control 34 to initiate operation of and receive feedback from coherency response control 34.

Coherency response control 34 receives input from CPU 20, CPU 22, tag pipeline 28, evict queue 24, read queue 26 and return buffer 16 to determine the location of data requested from a requesting entity at an external location from memory architecture 10.

Referring now to FIG. 3, the operation of an embodiment is described. In step 40, a data request is sent from a device external to memory architecture 10 that is connected to main bus 12. The data request is received by coherency requestor 39. Coherency requester 39, in turn, dispatches the address of the data request to coherency request queue 38. Coherency request queue 38 buffers this address before entry to memory architecture 10. The buffering by request queue allows multiple addresses of different data requests to be stored before being dispatched into memory architecture 10.

In step 42, upon receipt of the address from coherency requester 39, coherency request queue 38 communicates its acquisition of the address to coherency request control 36. Coherency request control 36 instructs coherency response control 34 to begin monitoring return buffer match signal 60, CPU match signal 62, L1 coherency response 64, L2 coherency response 66, evict match 68, read match 70, CPU signal 72 and CPU signal 74. Coherency response control 34 monitors these signals to receive indication from the respective device that the requested data resides in any of these locations as will be discussed in greater detail hereinafter.

In step 44, return buffer 16 is queried to determine whether or not the requested data is located therein. As the return buffer is able to maintain a few lines of data at any given time, the address information is preferably directly sent to the return buffer to determine the existence of the requested data therein. If the data is contained within return buffer 16, return buffer 16 dispatches a return buffer match signal 60 to instruct the coherency response control 34 that the requested data resides therein.

Next, in step 46, the address is dispatched along address bus 80 to tag pipeline 28. Here, tag pipeline 28 compares the address information with the L2 tags 30 to determine whether the requested data resides within memory 32. Likewise, the address is dispatched to CPU 20 and CPU 22 to determine whether the requested data is resident within the cache memory 220 and 222 of CPU 20 and CPU 22 respectively. If a cache 220 or 222 does not contain the requested data, the respective CPU informs the coherency response control 34 via respective signals CPU signals 72 and 74 accordingly. Here, the caches bypass the tag pipeline and dispatch signals 72 and 74 directly to the coherency response control 34. This allows the coherency scheme to continue searching the remainder of memory architecture 10. If the requested data is found to reside within memory 32, L2 coherency response signal 66 is dispatched to coherency response control 34 to indicate the data's existence therein.

In a preferred embodiment, CPUs 20 and 22 are cached by dedicated caches 220 and 222 respectively. As such, if the data is determined to exist therein, CPUs 20 and 22 inform the tag pipeline 28 of the existence of the requested data. The tag pipeline 28 then dispatches L1 coherency response signal 64 to inform coherency response control 34 that the requested data resides within the respective L1 cache.

Next, in step 48, the address is dispatched to evict queue 24 and read queue 26 via address bus 82. Evict queue 24 and read queue 26 then compares the address to addresses of data contained therein to determine whether the data resides within the queues. If the data resides within evict queue 24 or read queue 26, then respective evict match signal 68 or read match 70 signal is dispatched to coherency response control 34.

In step 50, the coherency response control 34 processes any received return buffer match signal 60, CPU match signal 62, L1 coherency response 64, L2 coherency response 66, evict match 68, read match 70, CPU signal 72 or CPU signal 74. With reference to FIG. 4, the responses to the coherency response control 34 are processed beginning with step 100 where it is determined whether the requested data is in evict queue 24, CPU 20, CPU 22 or memory 32. If the data resides within one of these locations, then a response is dispatched through the main bus 12 to the requesting entity in step 108 as will be described in greater detail hereinafter. If the data does not reside within one of these locations, then step 102 determines whether the data resides within the return buffer 16 or the read queue 26. If the data resides within one of these locations, then the coherency request is re-executed in step 106. Here, the process of FIG. 3 and beginning with step 42 is repeated. The existence of the data within return buffer 16 or the read queue 26 indicates that some other entity, such as CPU 20 or CPU 22, currently has ownership of this data and therefore has priority over the requesting entity. Therefore, repeating the steps of FIG. 3, beginning with step 42, allows the entity having ownership of the data to process or store the data before it is dispatched to the requesting entity. As such, with respect to return buffer 16, the data is allowed to be moved via data bus 130C of FIG. 2 to its destination location. Likewise, if the data resides in read queue 26, the data is dispatched along data bus 130D of FIG. 2 to CPUs 20 and 22. If the data does not reside within the return buffer or the read queue, then the process ends at step 104. If step 104 is reached, it is determined that the requested data does not reside within the memory architecture 10 and a miss is issued by coherency response control 34 to the requesting entity as will be described in greater detail hereinafter.

With reference to FIG. 5, if the data resides within evict queue 24, CPU 20, CPU 22 or memory 32, the received signals are processed by coherency response control 34 to generate an appropriate output. The output from the coherency response control is based on the state of the data request and the state of the stored data. As shown in FIG. 5, the state of the data request may be either a read or read & invalidate type request. A read request indicates that the requesting entity only desires to read the data. A read & invalidate request indicates that the requesting entity desires to not only read, but also modify the data. The state of the stored data may be as shared, private, or private dirty. If the data is shared, then copies of the data exist in multiple or shared locations. If the data is private, then a copy of the data is held only at any one location. In the private state, the data exists in an unmodified version from that existing in the main memory. As mentioned previously, If the data is held in a private dirty state, then the data is modified from that stored in main memory and is held exclusively at one location.

Accordingly, as discussed above with respect to step 52, the data was determined to exist in evict queue 24, CPU 20, CPU 22 or memory 32. With respect to FIG. 5, if the data is held in a shared state at one of these locations and the request is to only read the data, coherency response control 34 issues a hit via the main bus 12 to the requesting entity indicating the memory architecture 10 has the data. The hit indicates that data exists, but cannot be modified as it is in a shared state. Accordingly, portion of memory architecture 10 having possession of the data does not dispatch the data to the requesting entity. If the request, however, is a read & invalidate request, the coherency response control 34 indicates a miss to main bus 12. A miss signals the requesting entity that no portion of memory architecture 10 has the requested data. The requesting entity is therefore required to seek elsewhere to find the data. Likewise, if the data is held private by any portion of memory architecture 10, a miss is also issued by coherency response control 34 to the requesting entity via main bus 12. The reasons for providing a miss in these instances will be readily apparent to one skilled in the art.

If the data is held in memory architecture 10 in a private dirty state, then a hitm response is issued by coherency response control 34 to the requesting entity via main bus 12 irrespective of whether the data request is a read or read & invalidate request. The hitm response indicates that the data exists in one of the portions of the memory architecture 10, and that the data can be modified. This response may be given as the data has been modified and exists in only one location in its modified state.

When a hitm response is given, the data can be dispatched from its location to the requesting entity. Accordingly, if the data resides in caches 220 or 222, then the data is dispatched via bus 130A to main bus 12 and ultimately to the requesting entity in step 52. If the data is held by L2 cache 18, then the data is dispatched via coherency queue 141 to the main bus 12 and ultimately to the requesting entity in step 52.

Preferred embodiments have been disclosed. A person of ordinary skill in the art would realize, however, that certain modifications would come within the teachings of this Invention, and the following claims should be studied to determine the true scope and content of the invention. In addition, the methods and structures of representative embodiments can be incorporated in the form of a variety of embodiments, only a few of which are described herein. It will be apparent to the artisan that other embodiments exist that does not depart from the spirit of the invention. Thus, the described embodiments are illustrative and should not be construed as restrictive.

What is claimed is:

1. A memory architecture, comprising:
   at least one processor having a storage area;
   a cache memory in communication with the at least one processor to cache the at least one processor;
   a main bus in communication with the at least one processor and the cache memory to transmit and receive data to and from the cache memory and the at least one processor;
   a coherency control in communication with the cache and the at least one processor and configured to determine an existence or location of data in the cache or the storage area responsive to a data request from the main bus and dispatch a result indicating the existence or location of the data to the main bus,
   a return buffer buffering data transmission from the main bus to the cache and the at least one processor, wherein the coherency control is configured to communicate with the return buffer to determine the existence or location of the data in the return buffer; and
   a read queue configured to dispatch data from the cache, wherein the coherency control is in communication with the read queue to determine the existence or location of the data in the read queue;
   wherein the coherency control is configured to re-determine the existence or location of the data in the read queue, return buffer, storage area, and the cache if the coherency control determines that the data is in the return buffer or the read queue.

2. The memory architecture according to claim 1, further comprising:
   an evict queue communicating with the cache and configured to evict data from the cache;
   wherein the coherency control is in communication with the evict queue and configured to determine the existence or location of the data in the evict queue.

3. The memory architecture according to claim 1, further comprising:
   a plurality of cache address tags representing data stored in the cache; and
   a tag pipeline configured to compare the cache address tags to an address of the data;
   wherein the coherency control is configured to communicate the address of the data to the tag pipeline; and
   wherein the tag pipeline is configured to indicate to the coherency control whether the data exists in the cache based on a comparison between the cache address tags and the address of the data.

4. The memory architecture according to claim 1, wherein the coherency control further comprises:
   a coherency requestor; and
   a coherency request queue;
   wherein the coherency requestor is configured to dispatch an address of the data to the coherency request queue;
   wherein the coherency request queue is configured to dispatch the address of the data received from the coherency requestor to the at least one processor and the cache;
   wherein the at least one processor and the cache are configured to use the address of the data received from the coherency request queue to determine the existence or location of the data; and wherein the at least one processor and cache are configured to communicate the existence or location of the requested data to the coherency control.

5. The memory architecture according to claim 1, wherein the coherency control further comprises:
   a coherency response controller configured to receive communications from the cache and the at least one processor representing the existence or location of the data in the cache and the storage area;
   a coherency requestor responsive to a request from the main bus to dispatch an address the data responsive to the data request;
   a coherency request queue responsive to the address dispatched from the coherency requestor to store the address;
   a coherency request control responsive to the coherency request queue to initiate operation of the coherency response control to dispatch the address of the data from the coherency request queue to the at least one processor and the cache; and
   wherein the at least one processor and the cache are responsive to the address to determine the existence or location of the data and indicate the existence or location of the data to the coherency response control.

6. The memory architecture according to claim 5,
   wherein the coherency request queue is configured to communicate with the return buffer to determine the existence or location of the data in the return buffer.

7. The memory architecture according to claim 1, wherein:
   the at least one processor includes two processors;
   the cache caches the two processors; and
   the coherency control is configured to communicate with the two processors to determine an existence or location of data in the two processors.

8. The memory architecture according to claim 1, wherein:
   the storage area is configured to store the data in a shared, private or private dirty state;
   the coherency control is configured to:
   dispatch a hit result to a requesting entity along the main bus if the data is shared and the data request is a read request;
   dispatch a hitm result to the main bus if the data is private dirty;
   dispatch a miss result to the main bus if the data is private;
   wherein a hitm result indicates that a requesting entity can modify the data;
   wherein a hit result indicates that the requesting entity may only read the data;
   wherein a miss result indicates that the data does not exist; and
   wherein a read request indicates that the requesting entity desires only to read the data.

9. The memory architecture according to claim 8, wherein the coherency control is configured to dispatch a miss to the main bus if the data is shared and the data request is a read and invalidate request, wherein a read and invalidate request indicates that the requesting entity desires to modify the data.

10. A method for conducting coherency control of a memory architecture, the method comprising the steps of:
    receiving a data request for data from a requesting entity along a main bus;
    querying a cache and a storage area of a processor to determine an existence or location of the data in the cache or the storage area, wherein the cache caches the processor;
    querying a return buffer that returns data to the cache and a read queue that dispatches data from the cache to the processor or the main bus;
    querying the return buffer, read queue, storage area, and the cache to determine the existence or location of the data if the data is determined to exist in the read queue or the return buffer; and
    dispatching a result to the requesting entity along the main bus.

11. The method according to claim 10, further comprising the steps of:
    determining whether the data is stored as shared, private or private dirty in the query step;
    determining whether the data request is a read request or a read and invalidate request;
    wherein the read request indicates that the requesting entity desires to only read the data;
    wherein the read and invalidate request indicates that the requesting entity desires to modify the data;
    wherein shared indicates that copies of the data exist in a plurality of locations;
    wherein private indicates that the data is held by one entity in an unmodified state; and
    wherein private dirty indicates that the data is held by one entity in a modified state.

12. The method according to claim 11, wherein the dispatching step further comprises:
    dispatching a hit result in the dispatching step if the data request is a read request and the data is shared;
    dispatching a miss result in the dispatching step if the data is private; and
    dispatching a hitm result in the dispatching step if the data is private dirty;
    wherein the miss result indicates that the data does not exist in the query step;
    wherein the hitm result indicates that the requesting entity can modify the data;
    wherein the hit result indicates that the requesting entity can only read the data.

13. The method according to claim 12, wherein the dispatching step further comprises dispatching a miss result if the data is shared and the data request is a read and invalidate request.

14. A computer readable memory device comprising instructions for:
    reading a data request for data from a requesting entity along a main bus;
    querying a cache and a storage area of a processor to determine an existence or location of the data in the cache or the storage area, wherein the cache caches the processor;
    querying a return buffer that returns data to the cache and a read queue that dispatches data from the cache to the processor or the main bus;
    performing a query in the return buffer, read queue, storage area and the cache to determine the existence or location of the data if the data is determined to exist in the read queue or the return buffer; and dispatch a result to the requesting entity along the main bus.

15. The computer readable memory device according to claim 14, further comprising instructions for:
  determining whether the data is stored as shared, private or private dirty responsive to the instructions for querying;
  determining whether the data request is a read request or a read and invalidate request;
  wherein the read request indicates that the requesting entity desires to only read the data;
  wherein the read and invalidate request indicates that the requesting entity desires to modify the data;
  wherein shared indicates that copies of the data exist in a plurality of locations;
  wherein private indicates that the data is held by one entity in an unmodified state; and
  wherein private dirty indicates that the data is held by one entity in a modified state.

16. The computer readable memory device according to claim 15, wherein the instructions for dispatching further comprises instructions for:
  dispatching a hit result if the if the data request is a read request and the data is shared;
  dispatching a miss result if the data is private; and
  dispatching a hitm result if the data is private dirty;
  wherein the miss result indicates that the data does not exist responsive to the instructions for querying;
  wherein the hitm result indicates that the requesting entity can modify the data;
  wherein the hit result indicates that the requesting entity can only read the data.

17. The computer readable memory device according to claim 16, wherein the instructions for dispatching further comprises instructions for dispatching a miss result if the data is shared and the data request is a read and invalidate request.

* * * * *

UNITED STATES PATENT AND TRADEMARK OFFICE
CERTIFICATE OF CORRECTION

PATENT NO. : 7,032,077 B2  Page 1 of 1
APPLICATION NO. : 10/327778
DATED : April 18, 2006
INVENTOR(S) : Paul L. Rogers et al.

It is certified that error appears in the above-identified patent and that said Letters Patent is hereby corrected as shown below:

In column 6, line 20, in Claim 1, after "bus" delete "," and insert -- ; --, therefor.

In column 9, line 1, in Claim 14, delete "dispatch" and insert -- dispatching --, therefor.

In column 10, line 4, in Claim 16, after "if the" delete "if the".

Signed and Sealed this

Twenty-sixth Day of May, 2009

JOHN DOLL
*Acting Director of the United States Patent and Trademark Office*